United States Patent Office 3,811,997
Patented May 21, 1974

3,811,997
SMOKE AND FLAME RESISTANT
LAMINATE ARTICLES
Edward L. Yuan, Philadelphia, Pa., assignor to E. I. du
Pont de Nemours and Company, Wilmington, Del.
No Drawing. Filed Mar. 22, 1971, Ser. No. 126,926
Int. Cl. B32b 3/12, 17/04, 27/12
U.S. Cl. 161—68                                    2 Claims

ABSTRACT OF THE DISCLOSURE

Smoke and flame resistant structural laminate articles comprised of a film of an aromatic polyamide or polyimide laminated over an impregnated fibrous reinforced cloth which may optionally be laminated over a honeycomb structure.

BACKGROUND OF THE INVENTION

The use of structural laminates is well known in the construction industry. Various types of polymeric laminates have been developed for use in such fields as airplane interior construction. In these instances strength and light weight play an important role in determining the utility of a particular laminate.

As industry has become more safety conscious, a need for safer materials developed. Fire hazards are especially troublesome in the aircraft industry. Conventional laminates composed from various combinations of materials such as fibrous sheets, wood, epoxies or other polymeric coatings are usually combustible. These laminates have been coated with various metal foils such as aluminum in order to enhance their flame resistance. However, metal foils have the disadvantage of being expensive, electrically and/or thermally conductive and difficult to apply to intricately shaped structures.

SUMMARY OF THE INVENTION

This invention relates to structural laminates composed of impregnated fibrous sheets and honeycomb type structures coated with a polyimide or aromatic polyamide. The polyimide or polyamide is applied as a film over the exposed surfaces of various types of structural laminates. A relatively thin film is sufficient to significantly retard combustion of the laminate and reduce smoke effusion from any burning that does occur.

DESCRIPTION OF THE INVENTION

The object of this invention is to provide a laminate article coated with a polyimide or aromatic polyamide film. This film significantly improves the flame and smoke resistance properties of the laminate without detracting from any other physical properties.

The laminate which may be of any material or construction is usually composed of various types of fabrics which may be coated or impregnated, paper, inorganic materials such as metals, and organic materials such as wood and various types of polymeric materials. Especially desirable laminates are formed by laminating a layer of epoxy impregnated glass fabric over a honeycomb type structure made of a polymeric substance such as Nomex® nylon paper or a metal such as aluminum. Other fiber reinforced plastic laminates using resins such as polyester, polybutadienes, and polyacrylates, etc., and fibers such as Nomex® nylon and the like can also be effectively used.

There are a number of polyimides or aromatic polyamides which could be used in this invention. The polyimides disclosed in the following patents would provide effective flame and smoke resistant films when used in accordance with the teachings of this invention: U.S. Pat. 3,518,232, U.S. Pat. 3,518,219, U.S. Pat. 3,506,583, U.S. Pat. 3,505,168 and the following pending U.S. patent application Torelli, FFD 1324, Ser. No. 54,018, filed July 10, 1970, and now abandoned.

Especially useful polyimides are those characterized by the recurring structural unit having the following structural formula:

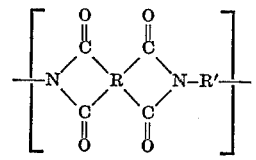

wherein R is a travalent aromatic radical, preferably containing at least one ring of six carbon atoms, said ring characterized by benzenoid unsaturation, the four carbonyl groups being attached directly to separate carbon atoms in a ring and each pair of carbonyl groups being attached to adjacent carbon atoms in a ring of the R radical; and wherein R' is a divalent benzenoid radical selected from the group consisting of

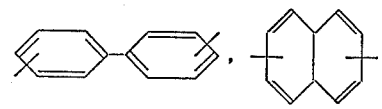

and

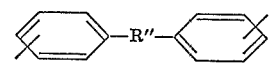

wherein R'' is selected from the group consisting of an alkylene chain having 1–3 carbon atoms,

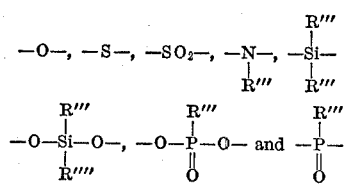

wherein R''' and R'''' are selected from the group consisting of alkyl and aryl.

The polyimides are prepared by reacting at least one organic diamine having the structural formula $$H_2N-R'-NH_2$$

wherein R' is a divalent benzenoid radical selected from the group consisting of

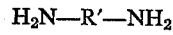

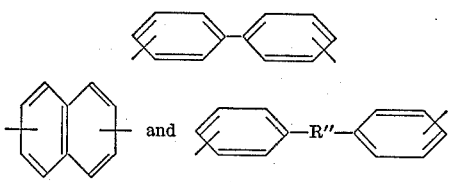

wherein R'' is selected from the group consisting of an alkylene chain having 1–3 carbon atoms,

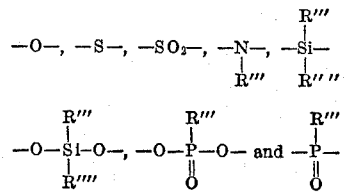

wherein R‴ and R⁗ are selected from the group consisting of alkyl and aryl, with at least one tetracarboxylic acid dianhydride having the structural formula:

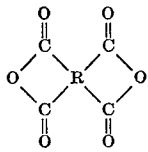

wherein R is a tetravalent aromatic organic radical, preferably containing at least one ring of six carbon atoms, said ring characterized by benzenoid unsaturation, the four carbonyl groups being attached directly to separate carbon atoms in a ring and carbon atoms of each pair of carbonyl groups being attached to adjacent carbon atoms in a ring of the radical.

These polyimides are disclosed in greater detail in U.S. Pat. 3,179,634, issued Apr. 20, 1965 to W. M. Edwards. The disclosure of this patent is hereby incorporated by reference. A preferred film is one consisting essentially of at least one polyimide of an aromatic tetracarboxylic acid dianhydride wherein all four carbonyl groups of said dianhydride are directly attached to an aromatic ring of said dianhydride such as pyromellitic dianhydride and an aromatic diamine having the formula $$NH_2-R'-NH_2$$

wherein R' is a divalent benzenoid radical selected from the group consisting of

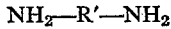

and

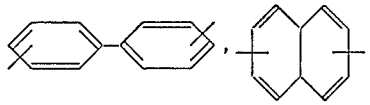

wherein R″ is selected from the group consisting of an alkylene chain having 1–3 carbon atoms,

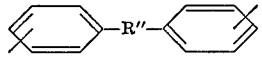

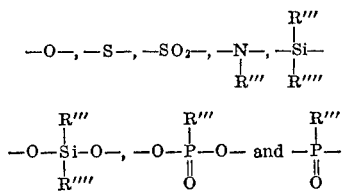

wherein R‴ and R⁗ are radicals having 1–6 carbon atoms selected from the group consisting of alkyl and aryl.

Suitable aromatic polyamides for use in this invention consist essentially of the following recurring structural units:

(I)

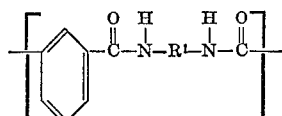

(II)

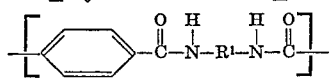

wherein the molar ratio of units (I) to units of (II) is from 10:90 to 90:10; to form a polymer having an inherent viscosity of about 0.05 to 1.0, measured at about 0.5% polymer solids in N-methyl pyrrolidone;

wherein R' is selected from the group consisting of

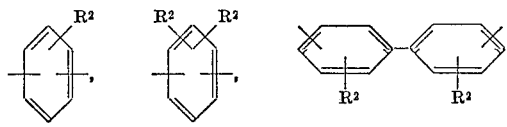

and

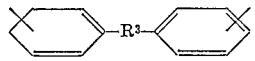

wherein $R^2$ is selected from the group consisting of hydrogen, and an alkyl group having 1–3 carbon atoms and $R^3$ is an alkylene group having 1–3 carbon atoms.

The polyimide or aromatic polyamide film can be coated on the various laminate structures by conventional laminating processes. Illustrative of these processes are vacuum bag and press lamination.

The polyimide film should be at least 0.1 mil in thickness, preferably about 0.5 mil. Films of lesser thickness would not provide adequate flame resistance or low smoke emission.

Utility

The laminates coated with the polyimides or aromatic polyamides have particular use in the aircraft industry. Polyimide or polyamide films greatly reduce the flammability and smoke emission potential of the coated laminate. With the ever increasing safety consciousness of the aircraft industry, these considerations have become very important. Also it should be noted that flame and smoke resistance are achieved without sacrificing any of the physical properties of the laminate or without incurring exceptional cost or in any other way detracting from the desirability or the particular laminate.

Since the polyimide and aromatic polyamide films are electrically and thermally non-conductive these films also serve as insulators of the particular laminate thereby reducing another potential safety hazard. The light-weight of the polyimide and/or aromatic polyamide film establishes its superiority over laminates coated with such materials as metal foils.

Use of this coated laminate is not restricted exclusively to the aircraft industry. This invention has utility in all areas where such laminates are used in situations in which it would be beneficial to have structures which are flame and smoke resistant.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept of the invention. All parts unless otherwise indicated are by weight.

Example 1

An epoxy/glass pre-preg manufactured by U.S. Polymeric Company was used to construct a three-ply laminate by laminating the glass pre-preg on each side of a ½" thick section of the Nomex® nylon paper honeycomb. The three-ply laminate was prepared by pressing at 350° F. and 200 p.s.i. of pressure for one hour. This laminate was designated Laminate A.

A second laminate, Laminate B, was made using the identical procedure used for preparing Laminate A and in addition a 1 mil polyimide film was laminated on each side of the epoyy/glass. This film is a self-supporting film polyimide formed from pyromellitic dianhydride of an aromatic diamine having the formula

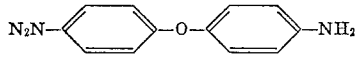

Laminates A and B were subjected to a 60-second vertical flame test [1] in which sections of the laminate were

---

[1] The standards for the vertical flame test are prescribed by Section 25.853 of the Federal Aeronautics Administration's Airworthiness Standards for compartment interiors of transport category airplanes. A draft-free vertical flammability test chamber was used which was built per Federal Specification CCC-T-191b Method 5903T and Appendix F of Section 25.853.

vertically held over a flame for sixty seconds and the results noted. After the flame was removed from Laminate A, the laminate continued to burn for an additional 30 seconds with considerable effusion of smoke. There was also substantial permanent damage imparted to the laminate due to the burning.

Sample B was subjected to the identical test as was Laminate A. After removal from the flame there was very little smoke generated and the laminate was self-extinguishing in a few seconds. There was only slight damage to the laminate due to the burning of the flame and smoke resistant laminated article having the polyimide exterior layer.

Example 2

A comparison similar to that of Example 1 was made on a laminate structure having a ⅜ inch Nomex® nylon paper honeycomb. The results of the comparison showed little evidence of burning of the laminate coated with a 0.5–1.0 mil coating of the polyimide as opposed to the laminate not having an outer polyimide coat which emitted an unacceptable amount of smoke and was severely damaged by the burning.

I claim:

1. A flame and smoke resistant laminate article consisting of a honeycomb type core having in intimate adherence thereto at least one layer of an impregnated glass fabric, said impregnated glass fabric having an aromatic polyamide film of at least 0.1 mil in thickness on its outermost surface, said aromatic polyamide film consisting essentially of the following recurring structural units (I)

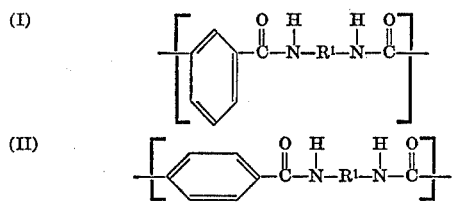

(II)

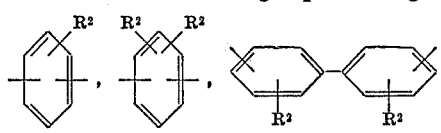

wherein the molar ratio of units (I) to units of (II) is from 10:90 to 90:10; to form a polymer having an inherent viscosity of about 0.05 to 0.5, measured at about 0.5% polymer solids in N-methyl pyrrolidone;

wherein $R^1$ is selected from the group consisting of

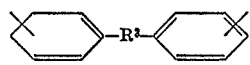

and

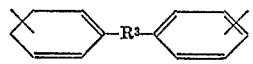

wherein $R^2$ is selected from the group consisting of hydrogen, and an alkyl group having 1–3 carbon atoms and $R^3$ is an alkylene group having 1–3 carbon atoms.

2. A flame and smoke resistant laminate article having inner layers comprised of materials selected from the group consisting of coated or impregnated fabrics or fibrous sheets, polymeric films, wood and metal, and an outer layer of an aromatic polyamide film of at least 0.1 mil in thickness, said aromatic polyamide characterized by the following structural unit (I)

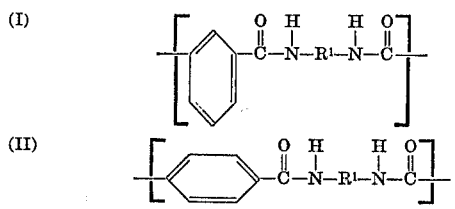

(II)

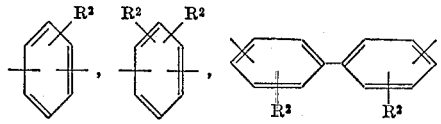

wherein the molar ratio of units (I) to units of (II) is from 10:90 to 90:10; to form a polymer having an inherent viscosity of about 0.05 to 0.5, measured at about 0.5% polymer solids in N-methyl pyrrolidone;

wherein $R^1$ is selected from the group consisting of

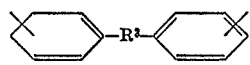

and

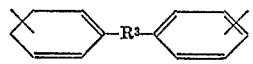

wherein $R^2$ is selected from the group consisting of hydrogen, and an alkyl group having 1–3 carbon atoms and $R^3$ is an alkylene group having 1–3 carbon atoms.

References Cited

UNITED STATES PATENTS

| | | | |
|---|---|---|---|
| 2,952,579 | 9/1960 | Merriman | 161—68 |
| 3,179,634 | 4/1965 | Edwards | 260—78 TF |
| 3,450,593 | 6/1969 | Fossier et al. | 161—68 X |
| 3,505,168 | 4/1970 | Dunphy et al. | 161—227 |
| 3,506,583 | 4/1970 | Boram et al. | 260—78 T F |
| 3,518,219 | 6/1970 | Lavin et al. | 260—78 T F X |
| 3,518,232 | 6/1970 | Bell | 260—78 T F |
| 3,519,510 | 7/1970 | Ardolino et al. | 161—68 |
| 3,575,756 | 4/1971 | Maus | 156—382 |
| 3,623,936 | 11/1971 | Hotz | 161—68 |
| 3,622,430 | 11/1971 | Jurisich | 161—68 |
| 3,703,422 | 11/1972 | Yoshino | 156—87 |

ALFRED L. LEAVITT, Primary Examiner

R. A. DAWSON, Assistant Examiner

U.S. Cl. X.R.

161—88, 92, 93, 151, 197, 219, 227, 230, 403; 252—8.1